United States Patent [19]
Chen et al.

[11] Patent Number: 5,813,003
[45] Date of Patent: Sep. 22, 1998

[54] PROGRESSIVE METHOD AND SYSTEM FOR CPU AND I/O COST REDUCTION FOR MINING ASSOCIATION RULES

[75] Inventors: Ming-Syan Chen, Taipei, Taiwan; Philip Shi-Lung Yu, Chappaqua, N.Y.

[73] Assignee: International Business Machines Corporation, Armonk, N.Y.

[21] Appl. No.: 778,132

[22] Filed: Jan. 2, 1997

[51] Int. Cl.⁶ ................................................. G06F 17/30
[52] U.S. Cl. ...................................... 707/6; 707/3; 707/5
[58] Field of Search ........................................ 707/3, 6, 5

[56] References Cited

U.S. PATENT DOCUMENTS

| | | | |
|---|---|---|---|
| 5,592,560 | 1/1997 | Deaton et al. | 382/100 |
| 5,615,341 | 3/1997 | Agrawal et al. | 705/10 |
| 5,724,573 | 3/1998 | Agrawal et al. | 707/6 |
| 5,758,147 | 5/1998 | Chen et al. | 707/6 |

OTHER PUBLICATIONS

Han et al., "Discovery of multiple level assocation rules from large databases", Proceedings of the 21st International Conference on Very Large Data Bases, pp. 420–431, abstract only, Sep. 1995.

Jong Soo Park, Ming–Syan Chen and Philip S. Yu, "An Effective Hash–Based Algorithm for Mining Association Rules," Sigmod Record, vol. 24, Issue 2, Jun. 1995, pp. 175–186.

Rakesh Agrawal and Ramakrishnan Srikant, "Fast Algorithms for Mining Association Rules," Proceedings of the 20th International Conference on Very Large Data Bases, Sep. 1994, pp. 487–499.

*Primary Examiner*—Thomas G. Black
*Assistant Examiner*—Jean R. Homere
*Attorney, Agent, or Firm*—Heslin & Rothenberg, P.C.

[57] ABSTRACT

A method and system for mining data in a transaction database using a progressive approach is presented. A portion of the transaction database is initially scanned with a relaxed selection criterion to generate a candidate item set to count. The remainder of the transaction database is then scanned to determine a number of occurrences of the candidate item set.

18 Claims, 7 Drawing Sheets

| TID | ITEMS | ITEMS AFTER FILTERING | 2-ITEM SETS TO BE CONSIDERED AFTER FILTERING |
|---|---|---|---|
| 500 | ACD | AC | {AC} |
| 600 | BCDE | BCE | {BC} {BE} {CE} |
| 700 | ABCE | ABCE | {AB} {AC} {AE} {BC} {BE} {CE} |
| 800 | BCE | BCE | {BC} {BE} {CE} |
| 900 | DE | – | – |
| 1000 | ABCE | ABCE | {AB} {AC} {AE} {BC} {BE} {CE} |
| 1100 | AE | AE | {AE} |
| 1200 | BCE | BCE | {BC} {BE} {CE} |
| 1300 | ADE | AE | {AE} |
| 1400 | BCE | BCE | {BC} {BE} {CE} |
| 1500 | ABCE | ABCE | {AB} {AC} {AE} {BC} {BE} {CE} |

| HASH ADDRESS | TRANS-ACTION 100 | TRANS-ACTION 200 | TRANS-ACTION 300 | TRANS-ACTION 400 | SUPPORT |
|---|---|---|---|---|---|
| 0 | AD | CE | CE | — | 3 |
| 1 | — | — | AE | — | 1 |
| 2 | — | BC | BC | — | 2 |
| 3 | — | — | — | — | 0 |
| 4 | — | BE | BE | BE | 3 |
| 5 | — | — | AB | — | 1 |
| 6 | AC CD | — | AC | — | 3 | fig. 6

| TID | ITEMS | ITEMS AFTER FILTERING | 2-ITEM SETS TO BE CONSIDERED AFTER FILTERING |
|---|---|---|---|
| 500 | ACD | AC | {AC} |
| 600 | BCDE | BCE | {BC} {BE} {CE} |
| 700 | ABCE | ABCE | {AB} {AC} {AE} {BC} {BE} {CE} |
| 800 | BCE | BCE | {BC} {BE} {CE} |
| 900 | DE | — | — |
| 1000 | ABCE | ABCE | {AB} {AC} {AE} {BC} {BE} {CE} |
| 1100 | AE | AE | {AE} |
| 1200 | BCE | BCE | {BC} {BE} {CE} |
| 1300 | ADE | AE | {AE} |
| 1400 | BCE | BCE | {BC} {BE} {CE} |
| 1500 | ABCE | ABCE | {AB} {AC} {AE} {BC} {BE} {CE} | fig. 7

| HASH ADDRESS | T500 | T600 | T700 | T800 | T900 | T1000 | T1100 | T1200 | T1300 | T1400 | T1500 | SUPPORT |
|---|---|---|---|---|---|---|---|---|---|---|---|---|
| 0 | – | CE | CE | CE | – | CE | – | CE | – | CE | CE | 10 |
| 1 | – | – | AE | – | – | AE | AE | – | AE | – | AE | 6 |
| 2 | – | BC | BC | BC | – | BC | – | BC | – | BC | BC | 9 |
| 3 | – | – | – | – | – | – | – | – | – | – | – | 0 |
| 4 | – | BE | BE | BE | – | BE | – | BE | – | BE | BE | 10 |
| 5 | – | – | AB | – | – | AB | – | – | – | – | AB | 4 |
| 6 | AC | – | AC | – | – | AC | – | – | – | – | AC | 6 | fig. 8

| TID | ITEMS |
|---|---|
| 100 | ACD |
| 200 | BCE |
| 300 | ABCE |
| 400 | BE |
| 500 | ACD |
| 600 | BCED |
| 700 | ABCE |
| 800 | BCE |
| 900 | DE |
| 1000 | ABCE |
| 1100 | AE |
| 1200 | BCE |
| 1300 | ADE |
| 1400 | BCE |
| 1500 | ABCE |

*fig. 9*

PROGRESSIVE METHOD AND SYSTEM FOR CPU AND I/O COST REDUCTION FOR MINING ASSOCIATION RULES

BACKGROUND OF THE INVENTION

1. Field of the Invention

The present invention relates to data mining association rules for a large transaction database.

2. Background Information

Due to the increasing use of computing for various applications, the importance of database mining is growing at a rapid pace recently. For example, progress in bar-code technology has made it possible for retail organizations to collect and store massive amounts of sales data. As another example, catalog companies can also collect sales data from the orders they receive. It is noted that analysis of past transaction data can provide very valuable information on customer buying behavior, and thus improve the quality of business decisions (such as what to put on sale, which merchandise to be placed on shelves together, how to customize marketing programs, to name a few). It is essential to collect a sufficient amount of sales data before any meaningful conclusion can be drawn therefrom. As a result, the amount of processed data tends to be huge. It is hence important to devise efficient ways to conduct mining on these data.

Another example of a source of data for data mining is on ordered data, such as stock market and point of sales data. Interesting aspects to explore from these ordered data include searching for similar sequences, e.g., stocks with similar movement in stock prices, and sequential patterns, e.g., grocery items bought over a set of visits in sequence.

Note that various data mining approaches have been explored in the literature. One of the important data mining problems is mining association rules. For example, given a database of sales transactions, it is desirable to discover all associations among items such that the presence of some items in a transaction will imply the presence of other items in the same transaction.

In general, data mining is a very application-dependent issue and different applications explored will require different mining techniques to cope with them. Notice, however, that in several data mining applications, the problem domain can only be vaguely defined, and hence a mathematical formulation of the problem is usually called for to abstract the original problem. As such, the corresponding parameter selection is often subject to interpretation. For example, to address the problem of identifying consumer buying patterns, a mathematical model of mining association rules is formulated. Based on this formulation, purchasing a group of M items is said to imply a high likelihood of concurrently purchasing another item B, if (1) the group of M items appears in at least S % of the transactions, and (2) among the transactions including these M items, C % of them also include item B. The terms "S" and "C" are referred to as the minimum support and confidence levels of the association rule, respectively. The selection of parameter values for S and C usually has to be based on experience or even resorting to trial-and-error.

It is noted that several applications require mining the transaction data to capture the customer behavior frequently. In those applications, the efficiency of data mining could be a more important factor than the requirement for complete accuracy of the results according to the mathematical formulation. Since the way that the confidence (C) and support (S) factors are selected is not very precise, i.e., somewhat arbitrary, missing some marginal cases with confidence and support levels at the borderline may have little effect on the quality of the solution to the original problem. Allowing imprecise results can, in fact, significantly improve the efficiency of the mining approach. Consequently, two methods and associated systems for mining association rules with adjustable accuracy are devised in this invention.

SUMMARY OF THE INVENTION

It is an object of this invention to provide efficient methods of association rule mining in a large database with adjustable accuracy to reduce CPU and I/O cost.

In this invention, two methods for mining association rules with adjustable accuracy are developed. By dealing with the concept of progressive refinement, both methods obtain some essential knowledge from a subset of the data (referred to as the initial scanned data) first, and in light of that knowledge, perform efficient association rule mining on the rest of the database. Specifically, a technique of relaxing the selection criterion based on the size of the initial scanned data is devised to achieve the desired level of accuracy. While both methods employ this relaxation technique, they differ from each other in their ways of utilizing the initial scanned data. The selection criterion, as well as the amount of the initially scanned data, can be adjusted so as to improve the result accuracy, while minimizing the corresponding execution time. Thus, one can effectively achieve a design trade-off between accuracy and efficiency with these two control parameters.

In a first aspect, the present invention provides a method of mining data in a transaction database using a progressive approach. The method comprises steps of: scanning a portion of the transaction database with a relaxed selection criterion to generate a candidate item set to count; and continuing to scan the remainder of the transaction database to determine a number of occurrences of the candidate item set. In a second aspect, the present invention provides a system for performing the method of the first aspect.

These, and other objects, features and advantages of this invention will become apparent from the following detailed description of the invention taken in conjunction with the accompanying drawings.

BRIEF DESCRIPTION OF THE DRAWINGS

FIG. 6 depicts the generation of a hash table used with the first aspect of the present invention.

FIG. 7 depicts the generation of a filtered transaction database in accordance with the present invention.

FIG. 8 depicts the generation of an extended hash table used with the second aspect of the present invention.

FIG. 9 depicts an unfiltered transaction database used to describe both aspects of the present invention.

DETAILED DESCRIPTION OF A PREFERRED EMBODIMENT

Figure 1:
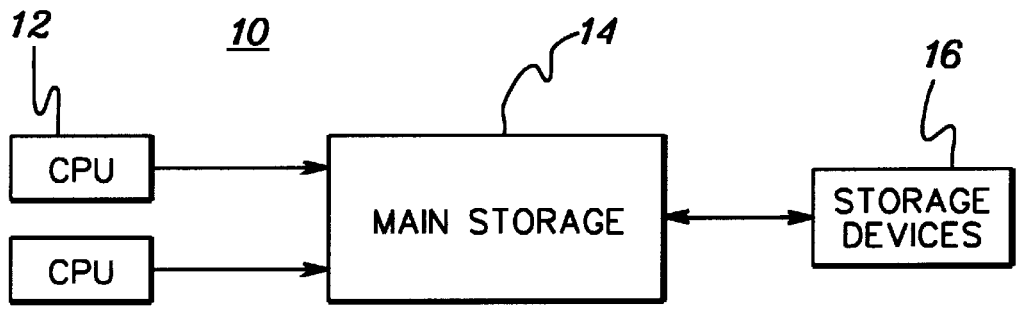
FIG. 1 depicts one example of hardware components associated with a method and system for data mining in accordance with the present invention.

One example of the hardware components associated with a method and system for data mining in accordance with the principles of the present invention is depicted in FIG. 1. As shown in FIG. 1, system 10 includes, for instance, one or more central processing units (CPUs) 12, a main storage 14 and one or more storage devices 16.

In general, central processing units 12 contain the sequencing and processing facilities for instruction execution, interruption action, timing functions, initial program loading and other machine related functions. Central processing units 12 are coupled to main storage 14 which is directly addressable and provides for high-speed processing of data by the CPUs. Main storage 14 may be either physically integrated with the CPUs or constructed in stand-alone units.

Main storage 14 is also couples to storage devices 16. Data is transferred from main storage 14 to storage devices 16 and from the storage devices back to main storage. In one embodiment, the data transferring operation associated with storage devices 16 is synchronous to the execution of instructions on the CPU and thus, it is advantageous to perform this operation as fast as possible.

Figure 2:
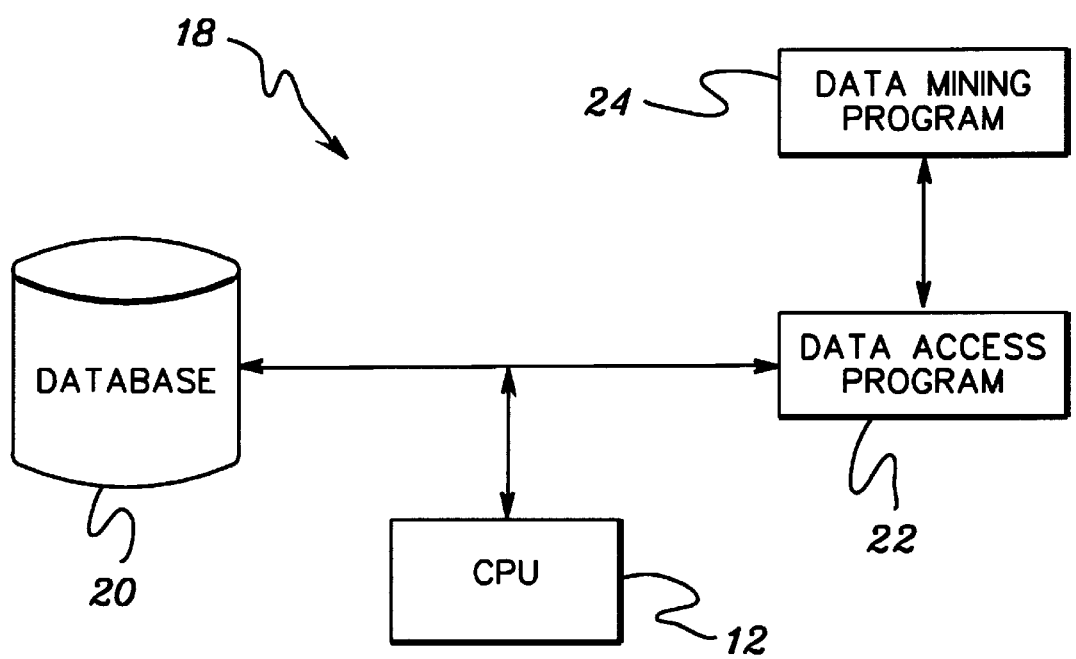
FIG. 2 depicts a portion of FIG. 1 in more detail.

FIG. 2 illustrates an embodiment of a system in accordance with the present invention. A data mining service 18 includes a CPU 12 from FIG. 1 with associated hardware, memory, operating system, etc. An example of such a system is that sold by International Business Machines Corporation under the trademark "RS6000". The CPU 12 is coupled to a database 20. Data is retrieved from the database 20 by a data access program 22 stored, for example, in main storage 14. An example of such a data access program is that sold by International Business Machines Corporation under the trademark "DB2/6000". A data mining program 24 accesses the data through the data access program and derives the pattern-like association rule in the data.

The progressive refinement methods proposed in this invention incorporate the iterative technique presented in the following references, which are herein incorporated by reference in their entirety: "Fast Algorithms for Mining Association Rules in Large Databases," Proceedings of the 20th International Conference on Very Large Data Bases, pages 478–499, September 1994, by R. Agrawal and R. Srikant (hereinafter called "Agrawal"); and "DHP" reported in "An Effective Hash Based Algorithm for Mining Association Rules," Proceedings of ACM SIGMOD, pages 175–186, May, 1995, J.-S. Park, M.-S. Chen, and P. S. Yu. We shall briefly describe Agrawal and DHP here with an understanding that these two schemes are known in the art and not part of the invention.

Figure 3:
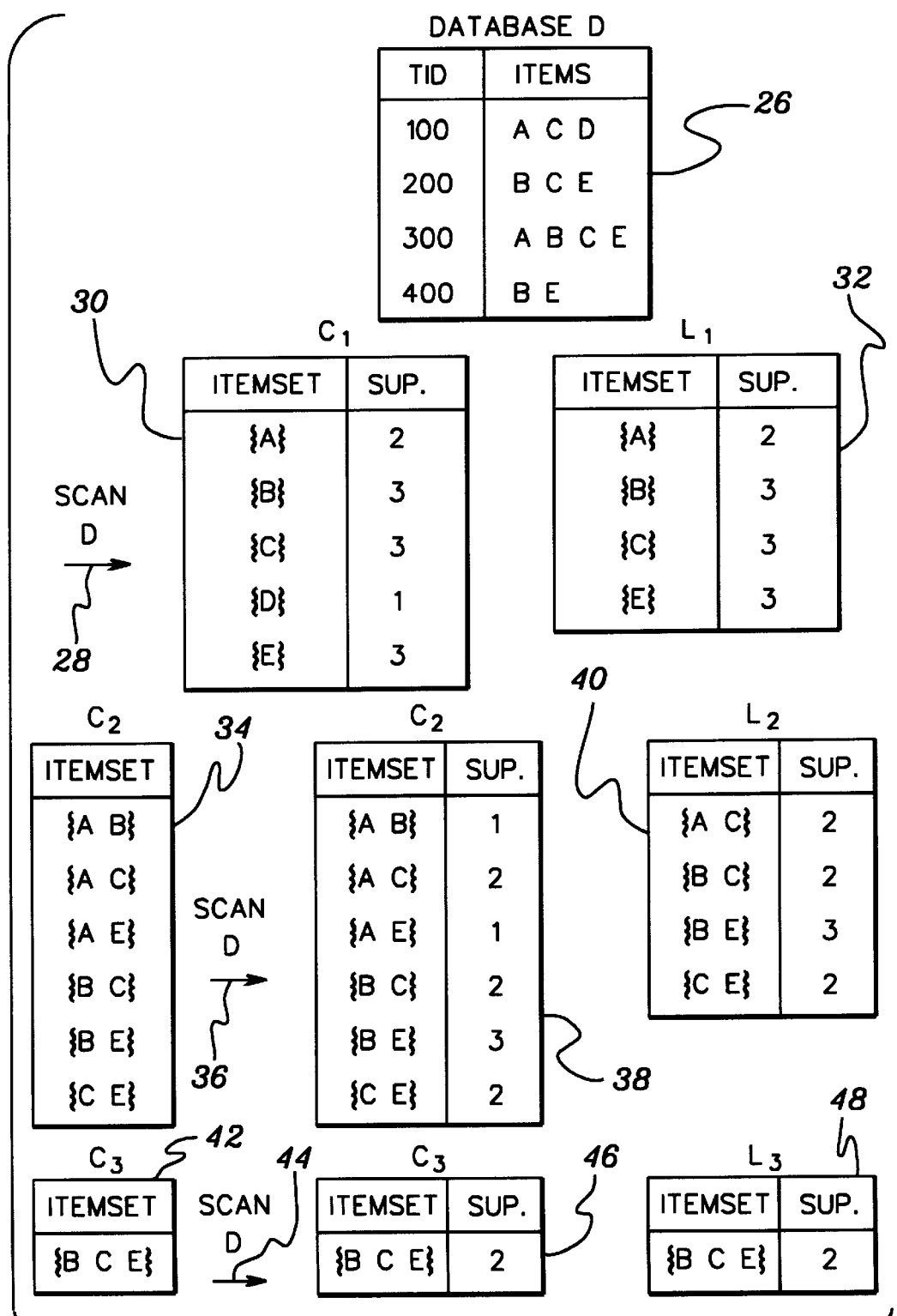
FIG. 3 depicts the generation of candidate item sets and large item sets from an exemplary transaction database in accordance with known principles.

Using an example transaction database 26 given in FIG. 3, we now describe the method used in Agrawal for determining large item sets. Database 26 includes transactions 100, 200, 300 and 400, each transaction including a list of items. In each iteration (or each pass), Agrawal constructs a candidate set of large item sets "C", counts the number of occurrences of each candidate item set, and then determines large item sets "L" based on a predetermined minimum support or minimum selection criterion. In the first iteration 28, Agrawal simply scans all the transactions to count the number of occurrences for each individual item. The set of candidate one-item sets, C1 (30), obtained is shown in FIG. 3. Assuming that the minimum transaction support required is 2 (i.e., S=40%), meaning that a given item must have occurred at least twice to be counted, the set of large one-item sets, L1 (32), composed of candidate one-item sets with the minimum support required, can then be determined.

To discover the set of large two-item sets, L2, in view of the fact that any subset of a large item set must also have minimum support, Agrawal uses L1 * L1 to generate a candidate set of item sets C2 (34), where "*" is an operation for concatenation in this case. The number of two-item sets in C2 consists of the total number of items in L1 multiplied by one less than that number, with the result divided by two. Next, the four transactions in D are scanned (36) and the support for each candidate item set in C2 is counted and tabulated (38). The set of large two-item sets, L2 (40), is therefore determined based on the support of each candidate two-item set in C2 compared to the minimum.

The third set of candidate item sets, C3 (42), is generated from L2 as follows. From L2, two large two-item sets with the same first item, such as {BC} and {BE}, are identified first. Then, Agrawal tests whether the two-item set {CE}, which consists of their second items, constitutes a large two-item set in L2 or not. Since {CE} is a large item set by itself, we know that all the subsets of {BCE} are large and then {BCE} becomes a candidate three-item set. There is no other candidate three-item set from L2. For example, {ACE} cannot be a candidate three-item set, since although {AC} and {CE} are in L2, {AE} is not. Agrawal then scans (44) all the transactions in D to find the C3 support (46), and discovers the large three-item set L3 (48) in FIG. 3 (i.e., {BCE} meets the minimum support requirement). Since there is no candidate four-item set to be constituted from L3, Agrawal ends the process of discovering large item sets.

Same as Agrawal, DHP also generates candidate k-item sets from L{k−1}. However, the DHP technique differs from Agrawal in that it employs a hash table Hk, which is built in the previous pass, to test the eligibility of a k-item set. Instead of including all k-item sets from L{k−1} * L{k−1} into Ck, DHP adds a k-item set into Ck only if that k-item set is hashed into a hash entry whose value is larger than or equal to the minimum transaction support required. DHP also reduces the database size by not only trimming each individual transaction size but also pruning the number of transactions in the database. L{k−1} * L{k−1} is obtained by concatenating pairs of (k−1)-item sets in L{k−1} having (k−2) common items. For example, if L4={abcd, bcde, cdek}, L4 * L4={abcde, bcdek}, where abcde is a concatenation of abcd and bcde, which share three common items (bcd), and bcdek, which is a concatenation of bcde and cdek. Note that transactions abcd and cdek only have two items (cd) in common. We note that both DHP and Agrawal are iterative algorithms on the large item set size in the sense that the large k-item sets are derived from the large (k−1)-item sets.

The present inventive methods for mining association rules with adjustable accuracy will now be described in detail. These two methods explore the trade-off between execution efficiency and result accuracy. A technique of relaxing the support factor (selection criterion) based on the size of the initial scanned data is utilized by both methods to effectively achieve the desired level of accuracy.

Due to the nature of progressive refinement, results may not be completely accurate. While employing the same notation as above, we put a "prime" next to the symbol of a data set to represent a data set from the progressive refinement methods of the present invention. For example, while Lk is the real set of large k-item sets, Lk' refers to the set of large k-item sets from the progressive refinement methods of the present invention. The meanings of Hk' and Ck' are defined similarly.

The first method, performing association rule mining by utilizing direct sizing, is referred to as method "DS". First, according to a portion or subset of the transaction database, DS determines L1' and H2' from the subset. See step 50 in FIG. 4. The minimum support required for a one-item set to be included into L1' is set to A×S where "S" is the given minimum support for large item sets, and "A", whose value is within [0,1], is the relaxation factor. Since A×S is smaller than S, L1' tends to be larger than the real L1. The relaxation factor, as well as the size of the initial data portion, can be properly adjusted so as to improve the result accuracy and to minimize the corresponding execution time. As the size of the data portion decreases, the relaxation factor A is preferably decreased, and vice-versa.

After L1' and H2' are obtained, DS then generates the candidate two-item sets, C2', from L1' and H2'. See step 52 in FIG. 4. From the prior description, it is noted that large k-item sets are derived from large (k−1)-item sets. That is, for an item to appear in a large k-item set, this item must have appeared in a large (k−1)-item set. In other words, if an item is not in L1' then this item can be removed from consideration for all later construction for Lk', k>1. This concept is incorporated into both of our schemes and found to be able to achieve much better execution efficiency. Explicitly, when generating the candidate two-item sets C2' from L1' and H2', we identify from L1' those items which are not used to generate C2'. Such a set of identified items is denoted by $F^\sim$ (i.e. the complement set of F), and is employed as a filter to improve the efficiency of large item set generation. As can be seen, this concept is implemented by inverse filtering, i.e., items falling into $F^\sim$ will be removed from later consideration. Clearly, one could implement it as normal filtering, i.e., only items in F will require further processing. The use of a set of large one-item sets as a filter to improve the generation of candidate large two-item sets is the very reason that DS is designed to obtain L1' from the initial scanned data first.

After C2' is obtained, method DS scans the rest of the transaction database to obtain the real L1, and also to determine L2' from C2'. See step 54 in FIG. 4. Although L1 is not used in subsequent steps of DS, L1 is part of the result of the inquiry, providing information in and of itself. If an item of a transaction belongs to $F^\sim$, then this item is filtered out for the formation of any two-item set in L2'. Finally, the remaining steps to find Lk, for k>2, are same as those in DHP. See step 56 in FIG. 4. It can be seen that since the whole database is scanned by DS to determine Lk', for k>1, the resulting Lk' is a subset of Lk for k>1.

The second method, referred to herein as method "SH", performs association rule mining by sizing with effective hash table construction. Method SH utilizes the same underlying concept as DS, but is different from the latter in their ways of utilizing the initial scanned data. Method SH is outlined as follows. First, according to a subset of the transaction database, SH determines L1' with a minimum support A×S, and obtains a set of items $F^\sim$ which is composed of items not belonging to L1'. See step 58 in FIG. 5. Then, SH scans the rest of transaction database to decide H2' and the real L1. See step 60 in FIG. 5. While all the items in each transaction are used to decide L1, items belonging to $F^\sim$ are filtered out for the generation of H2'. C2' is then generated from L1 and H2', and those items which are not used to generate C2' are added to $F^\sim$. See step 62 in FIG. 5. Note that as the number of items in $F^\sim$ increases, its filtering effect improves. Next, using $F^\sim$ as a filter, SH scans the whole transaction database to decide L2'. See step 64 in FIG. 5. Finally, the remaining steps to find Lk, for k>2, are same as those in DHP. See step 66 in FIG. 5. Same as in DS, it can be seen that the resulting Lk' from SH is a subset of Lk, for k>1.

At this point, for either method, the method is preferably repeated, gradually increasing the size of the initial data portion while gradually "un-relaxing" the selection criterion. In this way, the methods are recursive with a gradual tightening of the selection criterion.

An example to illustrate methods DS and SH will be now given. In this example, we are attempting to find frequently occurring sets of items in a transaction database and assume that the transaction database is database 76 given in FIG. 9. Further, assume that each letter of the alphabet in the list of items in FIG. 9 is assigned a number according to its position in the alphabet (e.g., letter A is assigned the number 1 and letter E is assigned the number 5). In addition, a hash function h(x,y) used in the example is defined as the whole number remainder of the sum of (x multiplied by 10) and y, divided by 7, the size of the hash table. Further, assume that the relaxed minimum support is 50%, and the real minimum support is 60%.

For method DS, a subset of the database is first chosen. Here, we choose transactions 100, 200, 300 and 400 for the subset. From the subset, L1' is determined, which comprises those items in the subset with a count of at least two. A count of two was determined by taking 50% (the relaxed minimum support) of the total number of transactions, in this case four. Where a minimum support would create a fraction, the number would be rounded up. A review of the subset reveals that L1' consists of {A, B, C, E}. The group of items in the subset that are not part of L1', group $F^\sim$, consists of item D.

Next, H2' is determined by hashing all possible two-item combinations in each transaction of the subset into a hash table using hash function h(x,y). See hash table 68 in FIG. 6. The group C2' can now be determined and consists of two-item sets from the set of possible two-item combinations of L1' (i.e., L1' * L1') that have at least the minimum support (here, two) in H2'. C2' is thus determined to be {AC, BC, BE, CE}.

The real L1 is now determined using the real minimum support (i.e., 60% of the total number of transactions in the database, or nine). L1 is the group of one-item sets from the transaction list in FIG. 9 occurring at least nine times. L1 comprises {B, C, E}. From C2', L2' can now be determined, and is the group of two-item sets from C2' that meet the real minimum support when each is counted from the whole transaction database after filtering through $F^\sim$, i.e., after item D is removed from each transaction in the transaction database. The group L2' comprises {BC, BE, CE}.

In the DS method, L2' would then be used to generate C3' and so on, except that in this example, the DS method ends with the determination of L2'. From the results, we know that in at least 60% of the transactions in database 76, item B implied the presence of items C and E, separately, and the presence of item C implied the presence of item E.

Method SH will now be described also with reference to transaction database 76 in FIG. 9. The initial steps of method SH are the same as that for method DS; that is, the two methods produce the same results up to and including the determination of H2' for the subset chosen. However, method SH then continues to build H2' to incorporate filtered items from transactions 500 through 1400. Initially, the transactions are filtered through group $F^\sim$. See list 70 in table 72 in FIG. 7. Then, each possible two-item combination from list 70 is hashed into hash table 68 using the hash function. See table 74 in FIG. 8. Note that the list support totals include that from FIG. 6.

After H2' is fully determined, the real L1 is then determined as in the DS method. Thus, L1 comprises {B, C, E}. From group L1, group C2' is determined, and comprises those two-item sets from L1 * L1 that meet the corresponding minimum support from H2'. The result is that C2' comprises {BC, BE, CE}.

The filter group F~ is updated with those items from L1 not used to generate C2'. Thus, group F~ comprises items A and D. The whole transaction database is then scanned after filtering out items A and D to determine the count for all two-item sets from C2'. Filtering shortens the transaction database to be reviewed. The result is the same as that for method DS; that is, group L2' comprises {BC, BE, CE}.

Figures 4, 5:
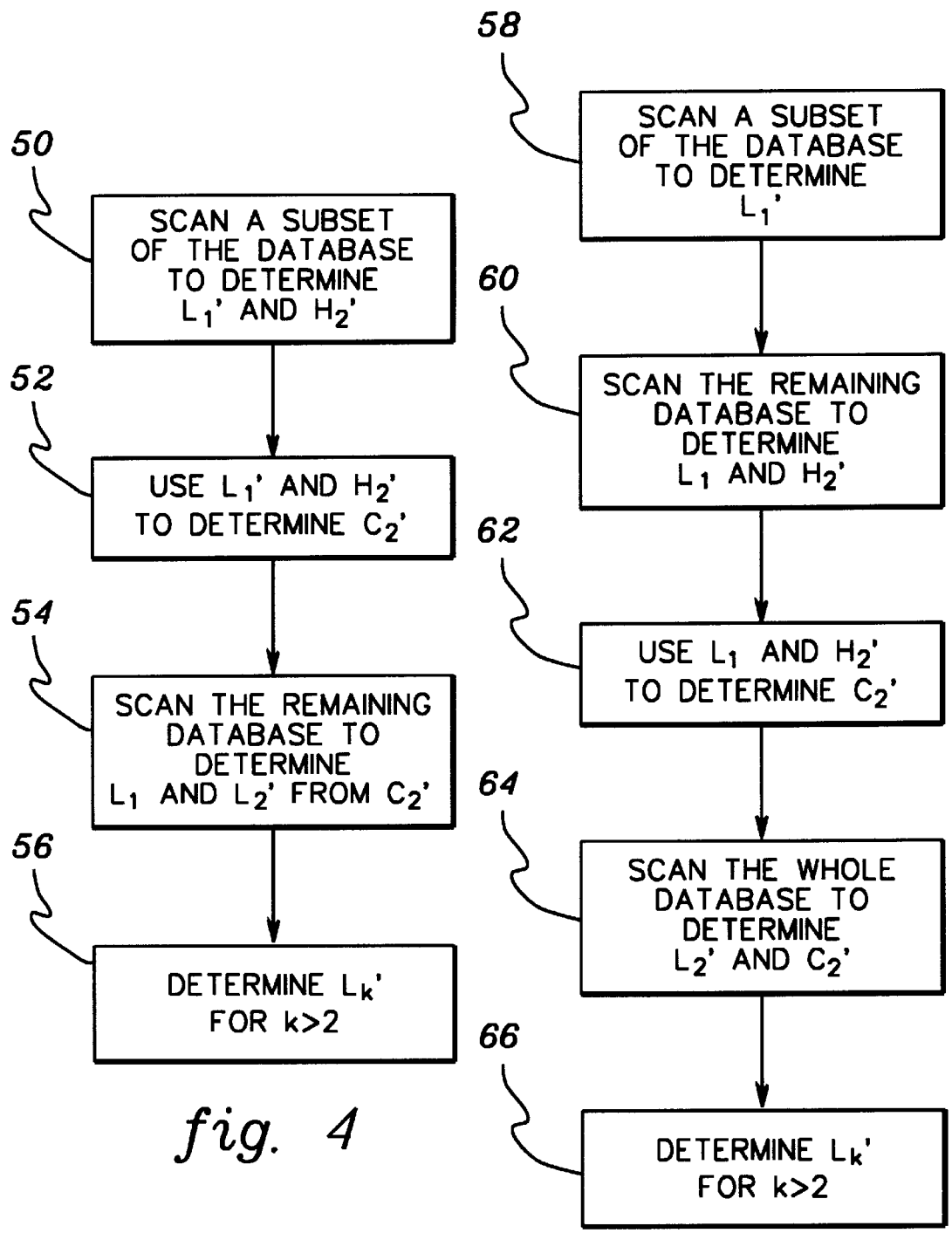
FIG. 4 is a flow diagram for the method of the first aspect of the present invention.
FIG. 5 is a flow diagram for the method of the second aspect of the present invention.

From FIGS. 4 and 5, it can be observed that the very difference between DS and SH, respectively, stems from the feature that SH obtains its L1' from its initial scanned data first, without generating H2' at the same time. Explicitly, while DS utilizes the L1' obtained from the initial scanned data to improve the efficiency of generating C2', SH utilizes the L1' from the initial scanned data to improve the efficiency of generating H2'. (The H2' of DS is obtained together with L1' from the initial scanned data.) It can also be seen that, as a consequence, method SH incurs one more run of database scan than method DS.

The reason that SH is so designed will now be explained. It is found from DS that with the performance improvement achieved, the generation of H2' could be costly itself. To improve the efficiency of generating H2', SH gets a set of large one-item sets from the initial scanned data first and uses it as a filter to facilitate the generation of H2'. Clearly, the above advantage of SH has to be evaluated in light of its extra run of database scan. In general, DS incurs shorter execution time while SH leads to more accurate results.

Now that the invention has been described by way of a preferred embodiment, various modifications and improvements will occur to those of skill in the art. Thus, it should be understood that the preferred embodiment has been provided as an example and not as a limitation. The scope of the invention is determined by the claims.

We claim:

1. A method of mining data in a transaction database using a progressive approach, the method comprising steps of:

scanning a portion of the transaction database with a relaxed selection criterion to generate a candidate item set to count; and continuing to scan the remainder of the transaction database to determine a number of occurrences of the candidate item set.

2. The method of claim 1, further comprising a step of repeating the steps of scanning and continuing to scan, wherein the portion of the transaction database is larger and the relaxed selection criterion is less relaxed.

3. The method of claim 1, wherein the step of scanning a database portion comprises:

generating a candidate one-item set by counting the number of occurrences of each item in the transaction database portion; and generating a first large one-item set from the candidate one-item set based on the relaxed selection criterion.

4. The method of claim 3, wherein the relaxed selection criterion comprises a predetermined minimum number of occurrences.

5. The method of claim 3, wherein the step of scanning a portion of the database further comprises:

generating candidate k-item sets from large (k−1)-item sets, wherein k>1; and generating large k-item sets from candidate k-item sets.

6. The method of claim 5, wherein the step of generating candidate k-item sets comprises:

hashing all possible k-item combinations from the transaction database portion into a hash table;

counting the number of hash entries for each hash address in the hash table; and generating a given candidate k-item set based on the corresponding hash address count.

7. The method of claim 5, wherein the step of continuing to scan the remainder of the transaction database comprises, for each large k-item set:

generating a filtered transaction database by removing items from the transaction database absent from the large (k−1)-item set; and generating the large k-item set by determining the number of occurrences in the filtered transaction database of each item set in the candidate k-item set based on an unrelaxed selection criterion.

8. The method of claim 5, wherein the step of generating candidate k-item sets comprises:

generating a filtered transaction database by removing items from the transaction database absent from the large (k−1)-item set; and hashing all possible k-item combinations from the filtered transaction database into a hash table;

counting the number of hash entries for each hash address in the hash table; and generating a given candidate k-item set based on the corresponding hash address count.

9. The method of claim 5, wherein the step of continuing to scan the remainder of the transaction database comprises, for each large k-item set:

generating a filtered transaction database by removing items from the transaction database absent from the large (k−1)-item set; and scanning the filtered transaction database to determine the number of occurrences of all k-item sets from the candidate k-item set.

10. A system for mining data in a transaction database using a progressive approach, the system comprising:

means for scanning a portion of the transaction database with a relaxed selection criterion to generate a candidate item set to count; and means for continuing to scan the remainder of the transaction database to determine a number of occurrences of the candidate item set.

11. The system of claim 10, further comprising means for repeating scanning and continuing to scan, wherein the portion of the transaction database is larger and the relaxed selection criterion is less relaxed.

12. The system of claim 10, wherein the means for scanning a database portion comprises:

means for generating a candidate one-item set by counting the number of occurrences of each item in the transaction database portion; and means for generating a first large one-item set from the candidate one-item set based on the relaxed selection criterion.

13. The system of claim 12, wherein the relaxed selection criterion comprises a predetermined minimum number of occurrences.

14. The system of claim 12, wherein the means for scanning a portion of the database further comprises:

means for generating candidate k-item sets from large (k−1)-item sets, wherein k>1; and means for generating large k-item sets from candidate k-item sets.

15. The system of claim 14, wherein the means for generating candidate k-item sets comprises:

means for hashing all possible k-item combinations from the transaction database portion into a hash table;

means for counting the number of hash entries for each hash address in the hash table; and means for generating a given candidate k-item set based on the corresponding hash address count.

16. The system of claim 14, wherein the means for continuing to scan the remainder of the transaction database comprises, for each large k-item set:

means for generating a filtered transaction database by removing items from the transaction database absent from the large (k−1)-item set; and means for generating the large k-item set by determining the number of occurrences in the filtered transaction database of each item set in the candidate k-item set based on an unrelaxed selection criterion.

17. The system of claim 14, wherein the means for generating candidate k-item sets comprises:

means for generating a filtered transaction database by removing items from the transaction database absent from the large (k−1)-item set; and means for hashing all possible k-item combinations from the filtered transaction database into a hash table;

means for counting the number of hash entries for each hash address in the hash table; and means for generating a give n candidate k-item set based on the corresponding hash address count.

18. The system of claim 14, wherein the means for continuing to scan the remainder of the transaction database comprises:

means for generating a filtered transaction database by removing items from the transaction database absent from the large (k−1)-item set; and means for scanning the filtered transaction database to determine the number of occurrences of all k-item sets from the candidate k-item set.

* * * * *